W. S. Mackintosh,
Axle Roller.
No. 78,984.      Patented June 16, 1868.
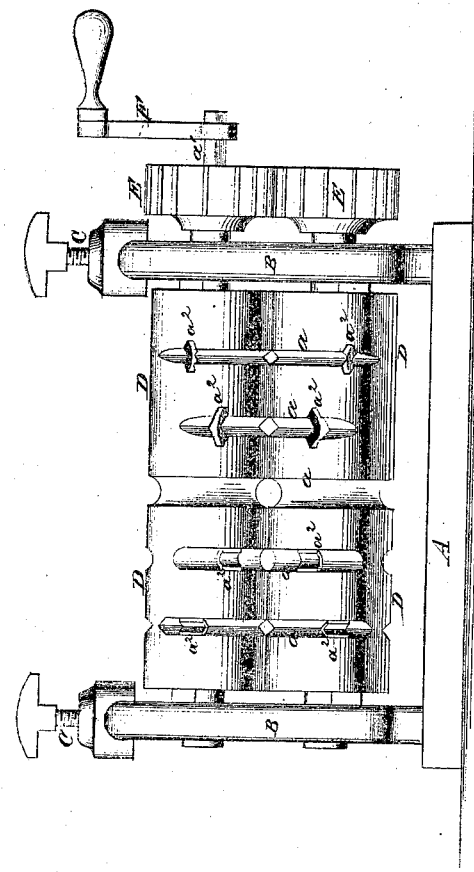
Witnesses                Inventor:
                         W. S. Mackintosh
                         per
                         attorneys

United States Patent Office.

W. S. MACKINTOSH, OF PITTSBURG, PENNSYLVANIA.

Letters Patent No. 78,984, dated June 16, 1868.

---

IMPROVED AXLE-ROLLERS.

---

*The Schedule referred to in these Letters Patent and making part of the same.*

---

TO ALL WHOM IT MAY CONCERN:

Be it known that I, W. S. MACKINTOSH, of Pittsburg, in the county of Allegheny, and State of Pennsylvania, have invented a new and useful Improvement in Rollers for Forming and Finishing Car, Wagon, and other Axles; and I do hereby declare that the following is a full, clear, and exact description thereof, which will enable those skilled in the art to make and use the same, reference being had to the accompanying drawings, forming part of this specification.

This invention relates to a new and improved method of constructing rollers for forming and finishing the axles of cars or wagons, whereby the same are more economically and perfectly formed and finished.

It consists of a pair of rollers, rotating in suitable boxes in a frame, connected together and to the power by spur-gear wheels, the faces of the said rollers being cut into grooves of such form as will cause the heated iron, when forced into said grooves, to assume the desired form.

Said grooves may be of any desired number, each one being smaller and nearer to the desired form than the one next before it.

The drawing is a front view of my invention.

A is a bed-plate.
B is the roller-frame.
C are set-screws.
$a$ are grooves in the rollers D.
D are the rollers.
E are the spur-gear wheels.
$a^1$ is the shaft of the upper roller.
F is a crank.
$a^2$ are indentations or enlargements, wider than the grooves $a$, and being part of the same, by means of which shoulders or irregular lines and surfaces are formed on the axle.

Upon any bed-plate A is erected a frame, B, provided with suitable boxes in the sides thereof, to receive the bearings of the rollers D, in the ordinary way, as shown, said frame being provided with suitable set-screws, C, by means of which the rollers D are set together, also in the ordinary way.

Said rollers are placed one over the other, having their axes parallel to each other, and are connected together by the spur-geared wheels E, keyed to the axles of the same, in the ordinary way, said rollers D being driven by any power applied to the shaft $a^1$, as by a crank, F, as shown in the drawing.

The rollers D are metallic rollers, and may be of any convenient length, and must have a circumference at least as great as the length of the axle to be formed.

Said rollers D have cut or cast into the faces or surfaces of the same the grooves $a$, so as the grooves $a$ in the under roller D shall exactly correspond with the grooves $a$ in the upper roller D, as shown.

The grooves $a$ are either cut or cast entirely around the rollers D, as shown in the middle groove in the drawing, or said grooves $a$ may extend so far around the same as to be equal to the length of the axle to be formed, and are made so as to receive the heated metal between the rollers D, and in the grooves $a$ of the same, and form the same into the exact shape of the spaces between the under and upper parts of the said grooves $a$, the grooves $a$ being widened or enlarged by the indentations or enlargements $a^2$, so as to form shoulders or irregular lines and surfaces on the axle to be formed, the grooves $a$ and the enlargements $a^2$ always being of a form so as that the under and upper parts of the same will form the axle or other article to be made in the desired shape, the centre groove $a$, or the groove all around the rollers D, being of a semicircular form in each roller, the object of the same being to work the iron to any required size before the same can be worked into axles.

Each of the grooves $a$ may be deeper and larger than the one next to the same on one side, so as that the axle may be formed in one groove $a$, and more perfectly formed in another groove $a$, and smoothed and finished in another of said grooves.

The operation is readily seen from the above description and the drawing.

Constructed as above described, it constitutes a convenient apparatus for forming the axles of cars, wagons, and other vehicles, the advantages of which are that the same are thereby more perfectly and economically formed.

I claim as new, and desire to secure by Letters Patent—

The rollers D, having grooves thereon, constructed and arranged substantially as shown and described, and for the purposes set forth.

W. S. MACKINTOSH.

Witnesses:
ALEXANDER HAYS,
J. M. MACKINTOSH.